No. 760,251. PATENTED MAY 17, 1904.
T. H. ROLFE.
AUTOMATIC WEIGHING APPARATUS.
APPLICATION FILED FEB. 27, 1904.
NO MODEL.

Inventor
Thos. H. Rolfe.

Witnesses

By
Attorney

No. 760,251.                                                              Patented May 17, 1904.

UNITED STATES PATENT OFFICE.

THOMAS H. ROLFE, OF BATTLECREEK, MICHIGAN, ASSIGNOR TO NICHOLS AND SHEPARD COMPANY, OF BATTLECREEK, MICHIGAN.

AUTOMATIC WEIGHING APPARATUS.

SPECIFICATION forming part of Letters Patent No. 760,251, dated May 17, 1904.

Application filed February 27, 1904. Serial No. 195,516. (No model.)

*To all whom it may concern:*

Be it known that I, THOMAS H. ROLFE, a citizen of the United States, residing at Battlecreek, in the county of Calhoun and State of Michigan, have invented a certain new and useful Automatic Weighing Apparatus, of which the following is a specification, reference being had therein to the acccompanying drawings.

This invention relates to automatic weighing apparatus, the object in view being to provide a weighing device by means of which material fed or delivered thereto will be automatically weighed and discharged therefrom, the apparatus by reason of its construction automatically setting itself or being intermittently operated by a predetermined weight of material deposited therein, so that successive charges or predetermined amounts of material will accumulate and be discharged without attention further than the placing of a suitable receptacle, such as a bag, beneath the discharge end of the apparatus to receive the successive charges of material as they are delivered by and from the device.

With the above and other objects in view, the nature of which will more fully appear as the description proceeds, the invention consists in an automatic weighing apparatus embodying certain novel features and details of construction and arrangement as herein fully described, illustrated, and claimed.

Figure 1:
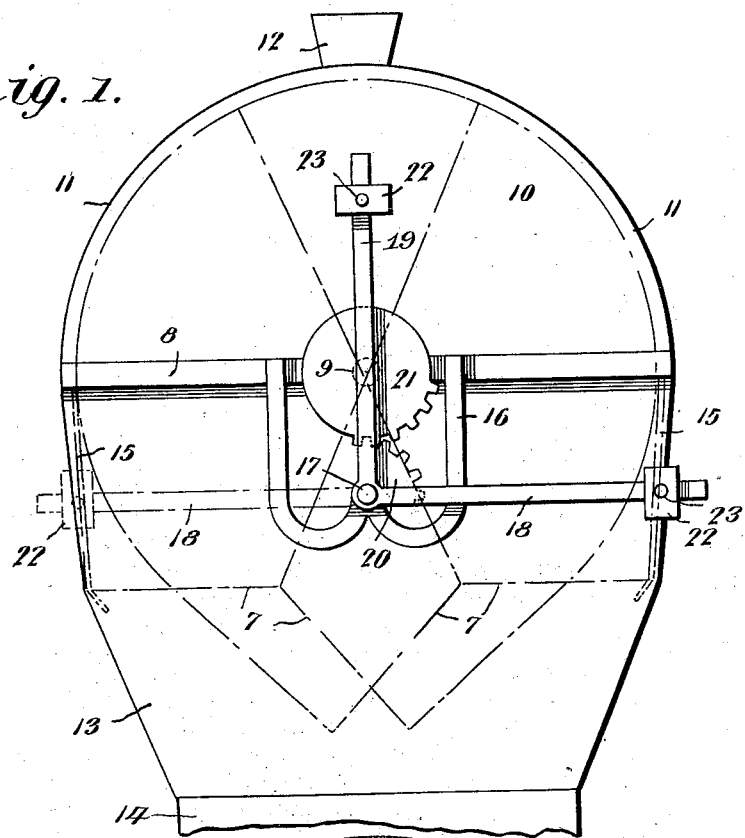
Figure 2:
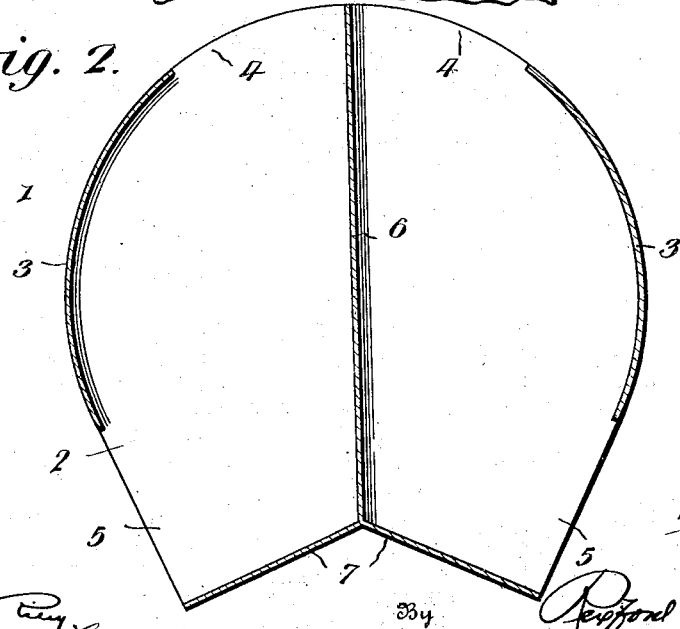

In the accompanying drawings, Figure 1 is a side elevation of an automatic weighing apparatus embodying the present invention. Fig. 2 is a vertical section through the oscillatory hopper or receptacle.

Like reference-numerals designate corresponding parts in both figures of the drawings.

The weighing apparatus contemplated in this invention comprises, essentially, an oscillatory weighing hopper or receptacle 1, the main body portion of which is substantially cylindrical, as best shown in Fig. 2 and also shown by dotted lines in Fig. 1, the said hopper comprising oppositely-arranged front and back walls 2, connected along portions of their outer edges by segmental sides 3, which terminate at the top, so as to leave entrance-openings 4, the said sides also terminating at their lower edges above the bottom of the hopper to form side discharge-openings 5. The front and back may be arranged any suitable distance apart, according to the desired capacity of the hopper, and the interior of the hopper is divided into twin compartments by means of a central partition or division-piece 6, which extends from top to bottom of the hopper and at its lower end meets the hopper-bottom, which consists of reversely-inclined portions 7, each of which inclines downward toward its respective discharge-opening and by reason of its inclination insures the discharge of its material contained in that compartment. It will be observed that the discharge-openings are arranged at the opposite sides of the hopper and that the outer edges of the front and back walls are disposed tangentially with relation to the segmental sides 3, the purpose of which will hereinafter appear. It will also be noted that the entrance-openings 4 are of equal size and arranged at opposite sides of the division-piece or partition 6, said openings, in fact, being divided from each other by the partition.

An oscillatory hopper 1 is mounted in a suitable frame, which preferably comprises a pair of frame-bars 8, located at opposite sides of the hopper and provided with bearings, in which are journaled trunnions 9, projecting from opposite sides of the hopper 1, one of said trunnions being indicated by dotted lines in Fig. 1. Above the bars 8 the hopper may be cased in, as shown in Fig. 1, wherein the casing is shown as comprising semicircular sides 10, connected by a rim 11, while at the highest and central portion of the casing is arranged an inlet or feeding hopper 12, through which the material is fed into the twin compartments of the oscillatory hopper. Beneath the bars 8 the casing may be continued downward and may also be constructed as shown at 13 and also connected with a discharge-spout 14, leading to any desired point for conducting the grain to and discharging the same into suitable receptacles, such as bags or boxes, placed beneath the same. At opposite sides of the casing sheet-metal plates or closures 15 are arranged so as to extend over and entirely inclose the discharge-openings 5 of the oscillatory hopper as the latter swings to one side or the other, the discharge-openings being thus alternately opened and closed automatically. The plate or closures 15 are preferably made thin, so as to bear with a yielding pressure against the sides of the oscillatory hopper where the discharge-openings occur, thus preventing leakage of the material as it passes into and accumulates within the temporarily-closed compartment.

Extending downward from one of the diametrical frame-bars 8 is a hanger 16, provided with a bearing, in which is journaled a spindle or stud-shaft 17, which carries an elbow-lever, or, in other words, a pair of arms 18 and 19, disposed substantially at right angles to each other and rigidly connected with a gear-segment 20, extending across the angle between the arms, as shown. The gear-segment 20 meshes with another gear or gear-segment 21, which has a fixed relation to the oscillatory hopper, being preferably mounted on one of the trunnions 9, so that when the hopper oscillates motion is communicated to the gear-segment 20, which acts to throw the arms 18 and 19 from one position to another, one position of said arms being illustrated in full lines in Fig. 1 and the other position being illustrated in dotted lines, each of the arms moving through approximately a quarter-circle. Each of the arms 18 and 19 is provided with an adjustable weight 22, adapted to be moved inward and outward on the arm and fastened by means of a set-screw 23 or its equivalent. In this way the weight of material to be deposited in each hopper-compartment and which will serve to oscillate the hopper may be determined upon and regulated to a nicety.

When the apparatus is in position to receive the incoming material, it will be noted that the division-piece or partition 6 stands at an angle from the vertical, so that the material falls into that compartment of the oscillatory hopper in which the discharge-opening is closed by the adjacent plate or closure 15. When the predetermined amount of material has been deposited in that compartment, the holding tendency of the weighted arms is overcome and that side of the hopper moves downward, thus through the medium of the gear-segment throwing the weighted arms from one side to the other, the weighted arms thus assisting in the movement of the hopper, which discharges as it swings and is thus held located at the other extreme of movement, in which position the division-piece or partition 6 is disposed at a reverse inclination and the discharge-opening of the other hopper-receptacle closed by means of the plate 15 at that side of the casing. The hopper thus oscillates or swings from one side to the other, alternately presenting the entrance-openings beneath the inlet or feeding hopper and also effecting a corresponding closure of the discharge-openings. The successive charges of material passing from the oscillatory hopper may be caught in any suitable receptacle placed beneath the apparatus. The apparatus as a whole may be mounted upon a threshing-machine, for example, and the threshed grain may be delivered by means of a suitable elevator into the inlet or feeding hopper 12.

One of the principal features of the present invention resides in the employment of the meshing gear-segments, which operate to throw the weighted arms from one side to the other and the location of the fulcrum of said arms below the axis of oscillatory movement of the weighing-hopper, the said particular relation of parts being productive of a more positive swinging and holding of the weighing-hopper by enabling the weighted arms to exert a greater leverage upon said hopper. The plates 15 are bent inward at their lower edges as an additional safeguard against leakage of material from the hopper.

Having thus described the invention, what is claimed as new is—

1. An automatic weighing apparatus comprising an oscillatory hopper provided with separate compartments adapted to be successively presented to the incoming material, each compartment having an entrance-opening and a side discharge-opening, a weighted arm operated upon by and operating upon the hopper, said arm swinging on a center located at a distance from the center upon which the weighing-hopper oscillates, and gearing connecting the axes of the hopper and weighted arm.

2. An automatic weighing apparatus comprising an oscillatory hopper having separate compartments adapted to be successively presented to the incoming material to be weighed, and a pivoted and weighted arm fulcrumed on a center located at a distance from the axis of movement of the weighing-hopper, said arm being operatively connected by spur-gearing with the hopper and coöperating therewith so as to alternately hold the compartments of the weighing-hopper in receiving position.

3. An automatic weighing apparatus comprising an oscillatory hopper embodying twin compartments adapted to be alternately presented to the incoming material, said compartments being provided with individual entrance and discharge openings, weighted arms disposed at an angle to each other and movable on a center located at a distance from the center of movement of the oscillatory hopper, and spur-gears connected respectively with the weighted arms and oscillatory hopper whereby said arms and the hopper coöperate, substantially as and for the purpose set forth.

4. An automatic weighing apparatus comprising an oscillatory hopper having twin compartments adapted to be alternately presented to the incoming material, each compartment being provided with individual entrance and discharge openings, a frame in which said hopper is mounted, yielding closures for the discharge-openings connected with the frame, and a weighted hopper-throwing arm pivotally mounted on a center at a distance from the center of movement of the hopper and geared to the hopper, substantially as described.

In testimony whereof I affix my signature in presence of two witnesses.

THOMAS H. ROLFE.

Witnesses:
  CHESTER P. ALDRICH,
  B. M. KETCHAM.